US011587023B2

(12) United States Patent
Kamaya et al.

(10) Patent No.: US 11,587,023 B2
(45) Date of Patent: *Feb. 21, 2023

(54) TRACKING MOVEMENT OF AN ITEM

(71) Applicant: International Business Machines Corporation, Armonk, NY (US)

(72) Inventors: Yamato Kamaya, Tokyo (JP); Kazutaka Kubota, Tokyo (JP); Hidekazu Tanaka, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 726 days.

This patent is subject to a terminal disclaimer.

(21) Appl. No.: 15/202,631

(22) Filed: Jul. 6, 2016

(65) Prior Publication Data

US 2016/0314434 A1 Oct. 27, 2016

Related U.S. Application Data

(63) Continuation of application No. 13/226,599, filed on Sep. 7, 2011, now Pat. No. 9,412,085.

(30) Foreign Application Priority Data

Oct. 12, 2010 (JP) .............................. JP2010-229605

(51) Int. Cl.
*G06Q 10/02* (2012.01)
*G07C 9/00* (2020.01)
(Continued)

(52) U.S. Cl.
CPC ........... *G06Q 10/087* (2013.01); *G06Q 10/02* (2013.01); *G06Q 10/08* (2013.01);
(Continued)

(58) Field of Classification Search
CPC .... G06Q 10/02; G06Q 10/08; G06Q 30/0645; G07F 7/08; G07C 9/00896;
(Continued)

(56) References Cited

U.S. PATENT DOCUMENTS 5,066,853 A 11/1991 Brisson
5,594,228 A 1/1997 Swartz et al.
(Continued)

FOREIGN PATENT DOCUMENTS

JP 2005050170 2/2005
JP 2005063322 3/2005
(Continued)

OTHER PUBLICATIONS

Translation of Ando, JPO Pub. No. 2009299424.*
(Continued)

*Primary Examiner* — Daniel Vetter
(74) *Attorney, Agent, or Firm* — Schmeiser, Olsen & Watts, LLP; Kimberly Zillig

(57) ABSTRACT

A method and associated system for managing an item in a place. Positional information about an operating object and positional information about the item is monitored at regular intervals by a receiver receiving locational coordinates of a tag associated with the item and a tag carried by the operating object. Based on the positional information, it is detected i) that the item in the place is being moved, (ii) that the operating object inside the place is moving, (iii) a distance between the location of the operating object and the item, and (iv) that the operating object inside the place and the item in the place are within a previously specified distance of each other. After the previous detections, it is determined that the operating object has illegitimately taken the item, which triggers preventing the operating object from removing the item from the place.

10 Claims, 4 Drawing Sheets

(51) Int. Cl.
| | |
|---|---|
| *G06Q 10/087* | (2023.01) |
| *G06Q 30/0645* | (2023.01) |
| *G06Q 50/28* | (2012.01) |
| *G06Q 10/08* | (2023.01) |
| *G08B 13/24* | (2006.01) |

(52) U.S. Cl.
CPC ......... *G06Q 30/0645* (2013.01); *G06Q 50/28* (2013.01); *G08B 13/2462* (2013.01); *G07C 9/00* (2013.01)

(58) Field of Classification Search
CPC ............ G07C 9/00904; G07C 9/00912; G08B 13/1436; G07B 15/00
See application file for complete search history.

(56) References Cited

U.S. PATENT DOCUMENTS

| | | | | |
|---|---|---|---|---|
| 5,774,876 | A * | 6/1998 | Woolley | G01S 5/0289 |
| | | | | 235/385 |
| 5,886,634 | A * | 3/1999 | Muhme | G07C 9/00111 |
| | | | | 340/5.31 |
| 5,963,131 | A * | 10/1999 | D'Angelo | G08B 13/1409 |
| | | | | 340/328 |
| 7,031,946 | B1 | 4/2006 | Tamai et al. | |
| 7,304,574 | B2 | 12/2007 | Romer et al. | |
| 7,573,418 | B2 | 8/2009 | Kawai et al. | |
| 8,089,341 | B2 | 1/2012 | Nakagawa et al. | |
| 2002/0070862 | A1* | 6/2002 | Francis | G06Q 10/087 |
| | | | | 340/572.1 |
| 2002/0089434 | A1* | 7/2002 | Ghazarian | G06Q 10/08 |
| | | | | 340/988 |
| 2004/0010338 | A1* | 1/2004 | Ogura | G06Q 10/02 |
| | | | | 700/214 |
| 2004/0011873 | A1* | 1/2004 | Canipe | G06K 7/10881 |
| | | | | 235/462.13 |
| 2005/0227707 | A1* | 10/2005 | Law | H04W 64/00 |
| | | | | 455/456.1 |
| 2006/0006999 | A1* | 1/2006 | Walczyk | G06Q 10/08 |
| | | | | 340/539.27 |
| 2006/0010504 | A1* | 1/2006 | Sharma | G08B 13/1436 |
| | | | | 726/35 |
| 2006/0064477 | A1* | 3/2006 | Renkis | G08B 13/19615 |
| | | | | 709/223 |
| 2006/0184376 | A1 | 8/2006 | Graves et al. | |
| 2006/0187043 | A1* | 8/2006 | Allen | G06Q 10/087 |
| | | | | 340/572.1 |
| 2006/0290519 | A1* | 12/2006 | Boate | G07C 9/00111 |
| | | | | 340/573.4 |
| 2007/0285209 | A1 | 12/2007 | Heusi et al. | |
| 2007/0290924 | A1 | 12/2007 | McCoy | |
| 2009/0045958 | A1* | 2/2009 | Spano | G08B 21/24 |
| | | | | 340/572.2 |
| 2009/0189736 | A1* | 7/2009 | Hayashi | G07C 9/257 |
| | | | | 340/5.81 |
| 2009/0237202 | A1* | 9/2009 | Mullet | G07C 9/00182 |
| | | | | 340/5.7 |
| 2010/0060452 | A1* | 3/2010 | Schuster | G06Q 10/06 |
| | | | | 340/572.1 |
| 2010/0102981 | A1* | 4/2010 | Nielsen | H04H 60/31 |
| | | | | 340/686.6 |
| 2010/0256983 | A1 | 10/2010 | Perkins | |
| 2011/0050876 | A1 | 3/2011 | Nagata et al. | |
| 2011/0063113 | A1 | 3/2011 | Hook | |
| 2011/0261650 | A1* | 10/2011 | Olshansky | G01S 15/88 |
| | | | | 367/89 |
| 2012/0025980 | A1* | 2/2012 | Derks | G07C 9/28 |
| | | | | 340/539.32 |
| 2012/0101714 | A1 | 4/2012 | Kamaya et al. | |
| 2012/0161963 | A1 | 6/2012 | Herrala | |

FOREIGN PATENT DOCUMENTS

| | | |
|---|---|---|
| JP | 2006113901 | 4/2006 |
| JP | 2006256857 | 9/2006 |
| JP | 2006318313 | 11/2006 |
| JP | 2007065950 | 3/2007 |
| JP | 2007079615 | 3/2007 |
| JP | 2007256998 | 10/2007 |
| JP | 2008146476 | 6/2008 |
| JP | 2008181557 | 8/2008 |
| JP | 2008201569 | 9/2008 |
| JP | 2009141816 | 6/2009 |
| JP | 2009299424 | 12/2009 |
| JP | 2010033585 | 2/2010 |
| JP | 2010516006 | 5/2010 |

OTHER PUBLICATIONS

Wilson, et al., Utilizing RFID Signaling Scheme for Localization of Stationary Objects and Speed Estimation of Mobile Objects, 2007 IEEE International Conference on RFID, Mar. 2007, pp. 94-99 (Year: 2007).*
Taisei Fukada, Innovative high performance RFID system MOjix Star System will be shipped to Japan, [Retrieved on Oct. 12, 2010], Retrieved from Internet: < URL: http://www-06.IBM.com/jp/press/2010/09/1301.html, 2 pages.
JPO Office Action dated Jan. 21, 2014, 2 pages.
Office Action (dated Jan. 28, 2015) for U.S. Appl. No. 13/226,599, filed Sep. 7, 2011, Conf. No. 3939.
Amendment(dated May 4, 2015) for U.S. Appl. No. 13/226,599, filed Sep. 7, 2011, Conf. No. 3939.
Final Office Action (dated May 18, 2015) for U.S. Appl. No. 13/226,599, filed Sep. 7, 2011, Conf. No 3939.
Final Amendment (dated Jul. 20, 2015) for U.S. Appl. No. 13/226,599, filed Sep. 7, 2011, Conf. No. 3939.
Advisory Action (dated Jul. 27, 2015) for U.S. Appl. No. 13/226,599, filed Sep. 7, 2011, Conf. No. 3939.
Notice of Appeal (Aug. 18, 2015) for U.S. Appl. No. 13/226,599, filed Sep. 7, 2011, Conf. No. 3939.
Appeal Brief (Oct. 19, 2015) for U.S. Appl. No. 13/226,599, filed Sep. 7, 2011, Conf. No. 3939.
Notice of Allowance (dated May 2, 2016) for U.S. Appl. No. 13/226,599, filed Sep. 7, 2011, Conf. No. 3939.
RFID Range And the Things That Affect It, p. 1, retrieved on Sep. 8, 2019 from the Internet: <URL: https://www.wireless-technology-advisor.com/rfid-range.html >, 1 page.

* cited by examiner

400

| OBJECT ID | RESERVATION FOR LENDING | DATE OF STARTING LENDING | DATE OF FINISHING LENDING | BORROWER ID | CURRENT POSITIONAL INFORMATION ABOUT BORROWER | CURRENT POSITIONAL INFORMATION ABOUT OBJECT |
|---|---|---|---|---|---|---|
| AD-6136 | Y | Jan 4, 2010 | Jan 5, 2010 | AA6400 | (100, 50) | (99, 51) |
| BO-7799 | Y | Jan 10, 2010 | Jan 30, 2010 | AA8000 | NULL | (200, 100) |
| ⋮ | ⋮ | ⋮ | ⋮ | ⋮ | ⋮ | ⋮ |

TRACKING MOVEMENT OF AN ITEM MANAGEMENT OF AN OBJECT

This application is a continuation application claiming priority to Ser. No. 13/226,599, filed Sep. 7, 2011, now U.S. Pat. No. 9,412,085, issued Aug. 9, 2016.

FIELD OF THE INVENTION

The present invention relates to a method and apparatus for managing an object, and particularly to a method and apparatus for checkout management of an object located in a place such as a warehouse or a shop.

BACKGROUND OF THE INVENTION

A conventional method for checkout management of commodities located in a facility such as a warehouse or a shop involves attaching a tag to each commodity, emitting a weak radio wave toward the tag from an antenna near a gate of the facility to detect a commodity passing through the gate, and restricting exit from the facility as necessary.

SUMMARY OF THE INVENTION

The present invention provides a method and associated system and computer program product for managing an item in a place, which comprises:

detecting, by a processor of a computer system, that: (i) the item in the place is being moved, (ii) an operating object inside the place is moving, and (iii) the operating object inside the place and the item in the place are within a previously specified distance of each other;

responsive to said detecting, said processor determining whether the operating object has a reservation for borrowing the item and subsequently determining that the operating object does not have said reservation for borrowing the item;

responsive to said determining that the operating object does not have said reservation for borrowing the item, said processor determining that the operating object has illegitimately taken the item; and responsive to said determining that the operating object has illegitimately taken the item, said processor preventing the operating object from removing the item from the place.

BRIEF DESCRIPTION OF THE DRAWINGS

FIG. 4 is a data structure of an object management database 1024, in accordance with embodiments of the present invention.

DETAILED DESCRIPTION OF THE INVENTION

Figure 1:
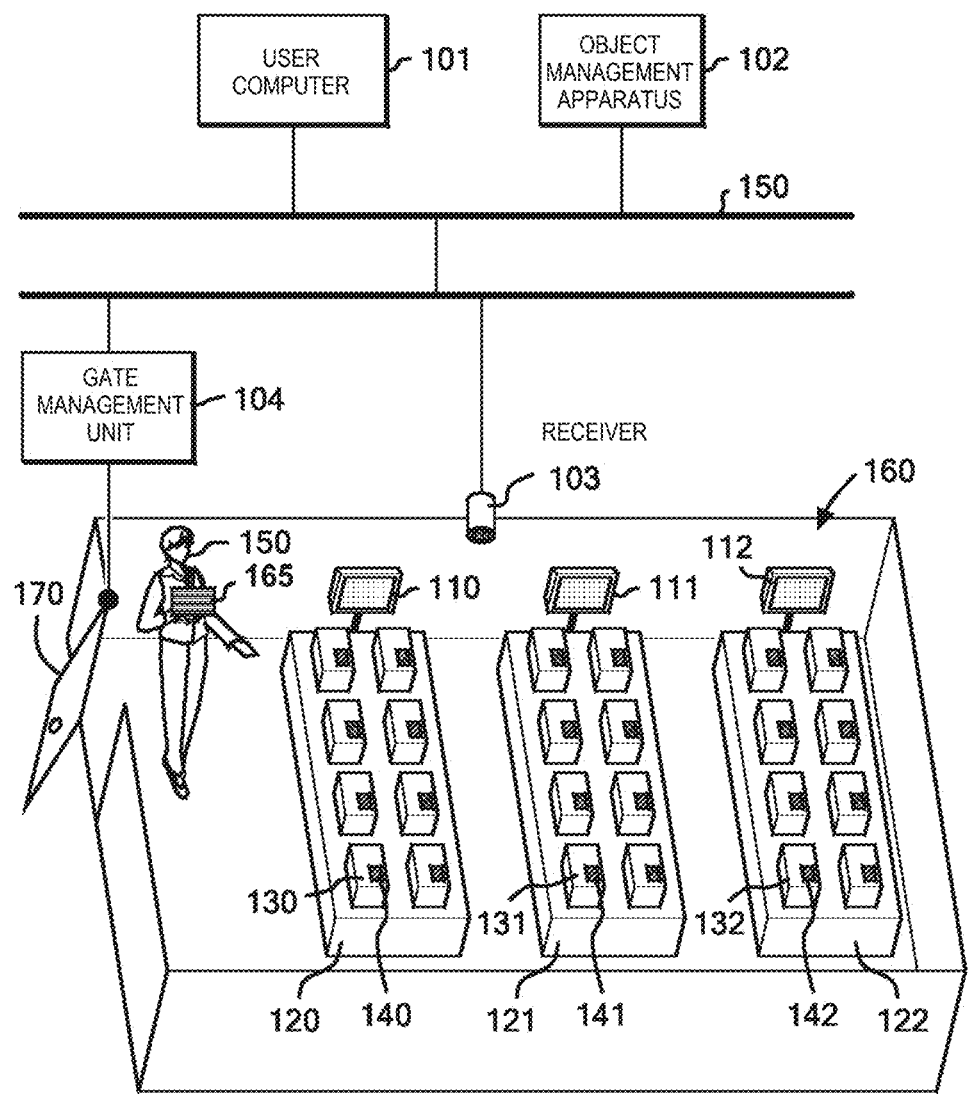
FIG. 1 is a conceptual block diagram of an object management system and an environment in which the system is applied, in accordance with embodiments of the present invention.

In the method of the present invention, a first positional information communication unit is associated with a first object (e.g., an item), and a second positional information communication unit is associated with a second object (e.g., a managing object) that potentially operates the first object.

A location management unit receives positional information about the first object from the first positional information communication unit, and the location management unit receives positional information about the second object from the second positional information communication unit.

The location management unit requests an object management unit to check an access right to the first object if a movement of the first object is detected, if a movement of the second object is detected, and if a location of the first object and a location of the second object are within a predetermined range.

The object management unit refers to access right information about the first object to determine whether or not the second object is authorized to move the first object.

In the above management method, the object management unit may display an alarm message on display means if the second object is not authorized to move the first object.

Alternatively or additionally, in the above management method, the object management unit may cause a block unit to restrict a movement of the second object if the second object is not authorized to move the first object.

A. Description of Terms

Terms used throughout the specification and the claims will be described next.

(1) Unit: Units include all devices connectable to a network or a bus.

For example, units include server computers, portable computers, displays, storage devices, office machines such as facsimiles and copiers, printers, and firmware.

Units may also be virtual units implemented by computer software.

Besides the above typical examples, a unit may necessarily be confined in a single housing but functions of such a unit as above may be physically distributed as long as the distributed functions serve as the unit.

Further, a unit may refer to a program code or a group of program codes residing in computer memory.

(2) Object: Objects include all tangibles, such as commodities, parts, intermediate products, machines, books, documents, natural products, and living things. Objects also include matters that typically assume no particular shapes, such as gases and liquids manageably contained in containers or the like.

In this specification, objects (i.e., operating objects) also include persons, conveyer machines, and robots capable of operating objects (e.g., items). Operating objects typically encompasses the act of carrying the objects or items, including borrowing and using the objects or items.

(3) Positional Information: Positional information includes any information capable of uniquely specifying the location of an object.

The positional information is typically represented in the form of, although not limited to, XYZ coordinates or polar coordinates.

The accuracy of the positional information can be selected as appropriate for the use of the present invention.

(4) Access Right: An access right refers to authority to operate an object, for example authority to carry an object.

B. Hardware Configuration

FIG. 1 is a conceptual block diagram of an object management apparatus and an environment in which the apparatus can be applied, it accordance with embodiments of the present invention.

In an embodiment, an object management apparatus 102 manages items such as 130, 131, and 132 placed on storage shelves 120, 121, and 122 in a warehouse 160, and a visitor 150 (e.g., a person). The warehouse 160 may be more generally a place such as a warehouse or a shop.

The objects (e.g., items) such as 130, 131, and 132 have RFID (Radio Frequency Identification) tags 140 141, and 142 associated therewith, respectively.

More specifically, the tags are attached to, embedded in, or tied with (e.g., a wire), the objects, so that the tags are moved with the movement of the objects.

Positional information about the tags is obtained with a receiver 103. The obtained positional information is sent to the object management apparatus 102.

As a technique of obtaining the positional information about the individual tags with the receiver 103, a Mojix STAR System of Mojix Inc. can be used. The Mojix STAR system realizes an increase in the receiver sensitivity by 100,000 times compared with conventional UHF-band REID readers, and a reading distance exceeding about 200 meters. The Mojix STAR system is also "capable of high-accuracy location detection with UHF-band passive tags (a location accuracy of about 1 to 3 m)."

Displays 110, 111, and 112 may be attached to the display shelves or may be placed at convenient locations in the warehouse 160.

The visitor 150 enters the warehouse 160, carrying an RFID tag 165.

The displays 110, 111, and 112 may display guidance for the visitor 150 by communicating with the object management apparatus 102 via the receive 103.

A block unit 170 is provided at agate of the warehouse 160.

The block unit 170 may be a bar for restricting entrance and exit or an automatic door, for example.

A gate management unit 104 cooperates with the object management apparatus 102 to control the operation of the block unit 170.

A user computer 101, including an input device and a display device (not shown), inputs data to the object management apparatus 102 through the input device and displays data received from the object management apparatus 102 on the display device.

The user computer 101, the object management apparatus 102, the gate management unit 104, and the receiver 103 are interconnected via a communication network 150 such as a local area network.

Figure 2:
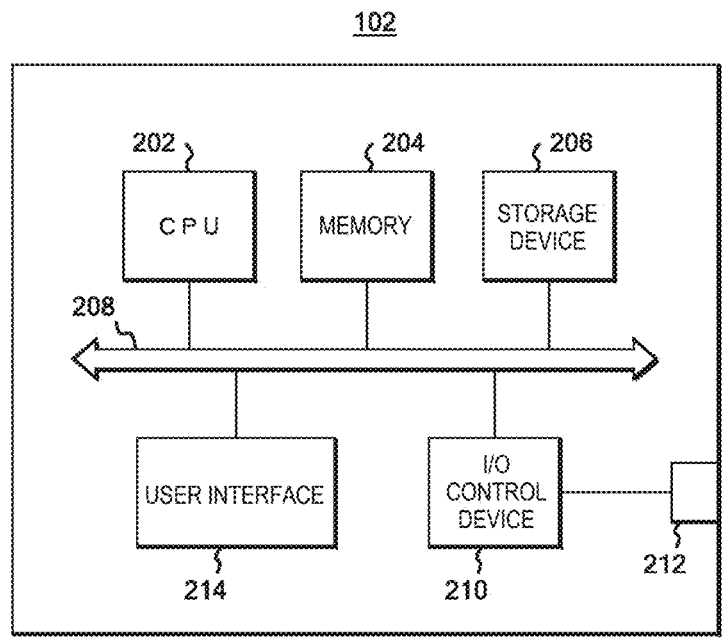
FIG. 2 is a diagram of a hardware configuration for implementing an object management apparatus of the present invention, in accordance with embodiments of the present invention.

FIG. 2 is a diagram of a hardware configuration for implementing the object management apparatus 102, in accordance with embodiments of the present invention. A computer system of the present invention comprises the hardware configuration depicted in FIG. 2 of the object management apparatus 102.

The other units in FIG. 1 (i.e., the user computer 101, the gate management unit 104, and the receiver 103) may also be implemented in a similar hardware configuration within a computer system.

Components to be described below are illustrative, and not all of them are required components for the present invention.

Each unit may have some of its components removed or added as appropriate for functions of the unit.

The unit includes a CPU 202, a memory 204, a storage device 206, an I/O control device 210, a user interface 214, a bus 208 interconnecting these components, and a communication port 212.

Code of a computer program running on the unit may be stored in the storage device 206 or may be introduced into the memory 204 from an external apparatus via the communication port 212 and the I/O control device 210.

The computer program code may be executed by the CPU 202 after being loaded into the memory 204, or may be executed by the CPU 202 while remaining stored in the storage device 206. A computer program product comprises a computer readable storage device (e.g., the storage device 206) such that the program code is stored on the storage device, wherein the program code is configured to be executed by a processor (e.g., the CPU 202) to perform the methods of the present invention.

In any case, the memory 204 may also be used as temporary storage memory in one embodiment.

The user interface 214 is used for displaying the operation state of the unit, inputting the operation mode, and the like.

The computer program code may be divided into pieces and recorded separately on a plurality of storage media. Part of the divided pieces of code may be recorded on a storage medium in another external information processing apparatus connected to the unit via the communication port 212 and the succeeding communication network 150, and the CPU 202 may cooperatively execute the divided pieces of code. Distributing the divided pieces of code to a plurality of apparatuses and cooperatively executing the pieces of code is embodied as a client-server system for example. Which pieces of code are executed by each apparatus to implement its functions is a matter of choice as appropriate in system design, and the present invention encompasses any form of such choice.

The unit ay also be configured as follows. The unit is physically separated on the basis of functional blocks to be described below. The hardware as shown in FIG. 2 is provided for each functional block, and the functional blocks cooperate via the respective communication ports 212.

An operating system running in the unit may be, although is not necessarily, an operating system that supports a graphic user interface multi-window environment as standard, such as Windows XP (R), AIX (R), or Linux (R), or any other operating system.

The present invention is not limited to any particular operating system environment.

A computer system rises a processor (e.g., the CPU 202), a memory (e.g., the memory 204) coupled to the processor, and a computer readable storage device coupled to the processor, said storage device containing program code configured to be executed by the processor via the memory to implement the methods of the present invention.

C. System Configuration

Figure 3:
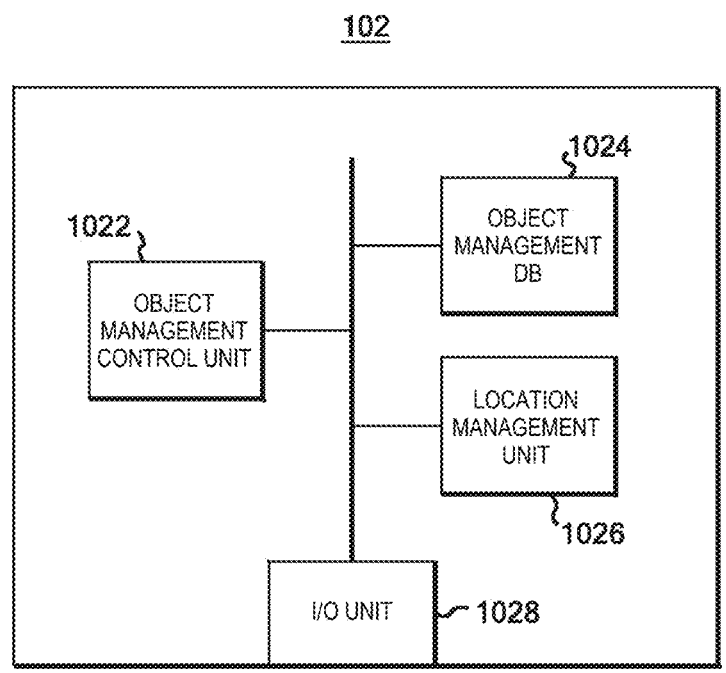
FIG. 3 is a conceptual diagram of a system configuration of the object management apparatus, in accordance with embodiments of the present invention.

FIG. 3 is a conceptual diagram of a system configuration of the object management apparatus, in accordance with embodiments of the present invention.

The object management apparatus 102 includes an object management control unit 1022, an object management database 1024, a location management unit 1026, and an I/O unit 1028.

<Object Management Control Unit>

The object management control unit 1022 sends a command for obtaining current positional information about an individual object (e.g., an item) to the receiver 103 via the I/O unit 1028.

The object about which the positional information should be obtained is identified by referring to the object management database 1024.

The object management control unit 1022 obtains the current positional information about the individual object from the receiver 103 via the I/O unit 1028 and updates the content of the object management database 1024.

Also, in response to a notification of the entrance of the visitor 150 by the gate management unit 104, the object management control unit 1022 sends a command for obtaining positional information about the visitor 150 to the receiver 103 and updates the positional information about the visitor 150 in the object management database 1024.

The object management control unit 1022 may send the commands for obtaining the positional information to the receiver 103 at regular intervals.

Alternatively or additionally, once the visitor 150 is recognized by the object management control unit 1022, the object management control unit 1022 may obtain the positional information at regular intervals only about the visitor 150 and about an object that the visitor 150 is authorized to access.

The object management control unit 1022 obtains, from the receiver 103, the positional information about the RFID tags such as 140, 141, and 142 attached to the objects such as 130, 131, and 132 in the warehouse 160, and about the RFID tag 165 carried by the visitor 150, and stores the positional information in the object management database 1024.

The location management unit 1026 refers to the object management database 1024 to monitor, at regular intervals, the positional information about the visitor 150 (who borrows an object) and the positional information about the object that the visitor intends to borrow.

The location management unit 1026 also monitors changes in the positional information about the object over time to determine the moving speed (i.e., velocity) of the object.

As will be described below, if the positions and the moving speeds of the visitor 150 and the object meet certain relationships, the object management control unit 1022 is notified of this fact.

FIG. 4 is a data structure 400 (in the form of a table) of the object management database, in accordance with embodiments of the present invention.

The structure shown in FIG. 4 is merely an example, and the data arrangement order and data types are not limited to the example shown. In short, it is only necessary that the positional information about the objects (e.g., items) 130, 131, and 132, the positional information about the visitor 150, and the access right of the visitor 150 to an object are reflected.

The data structure 400 is a reservation table that includes an identifier 402 of an object, whether or not a reservation for lending of the object has been made 404, the date of starting the lending 406 of the object, the date of finishing the lending 408 of the object, an identifier 410 of borrower who is an operating object who borrows the object (e.g., an operating object such as the visitor 150 authorized to enter the room and take out the object), current positional information 412 about the borrower (e.g., visitor 150), and current positional information 414 about the object.

For example, an object AD-6136 is reserved for lending, and the date of starting the lending is Jan. 4, 2010, and the date of finishing the lending is Jan. 5, 2010.

The borrower is AA6400.

This borrower AA6400 is permitted to enter the warehouse 160 in a period between these dates of Jan. 4, 2010 and Jan. 5, 2010.

The entrance is permitted or denied by the object management control unit 1022 through referring to the object management database 1024 and controlling the gate management unit 104.

The current location of the visitor is (100, 50), and the current location of the object is (99, 51).

An object BO-7799 has an expected borrower AA8000, who has not entered the warehouse 160. The object is stored at a location (200, 100).

The I/O unit 1028 connects the object management control unit 1022 to the gate management unit 104, the receiver 103, and the displays 110, 111, and 112 via the external network 150.

Figure 5:
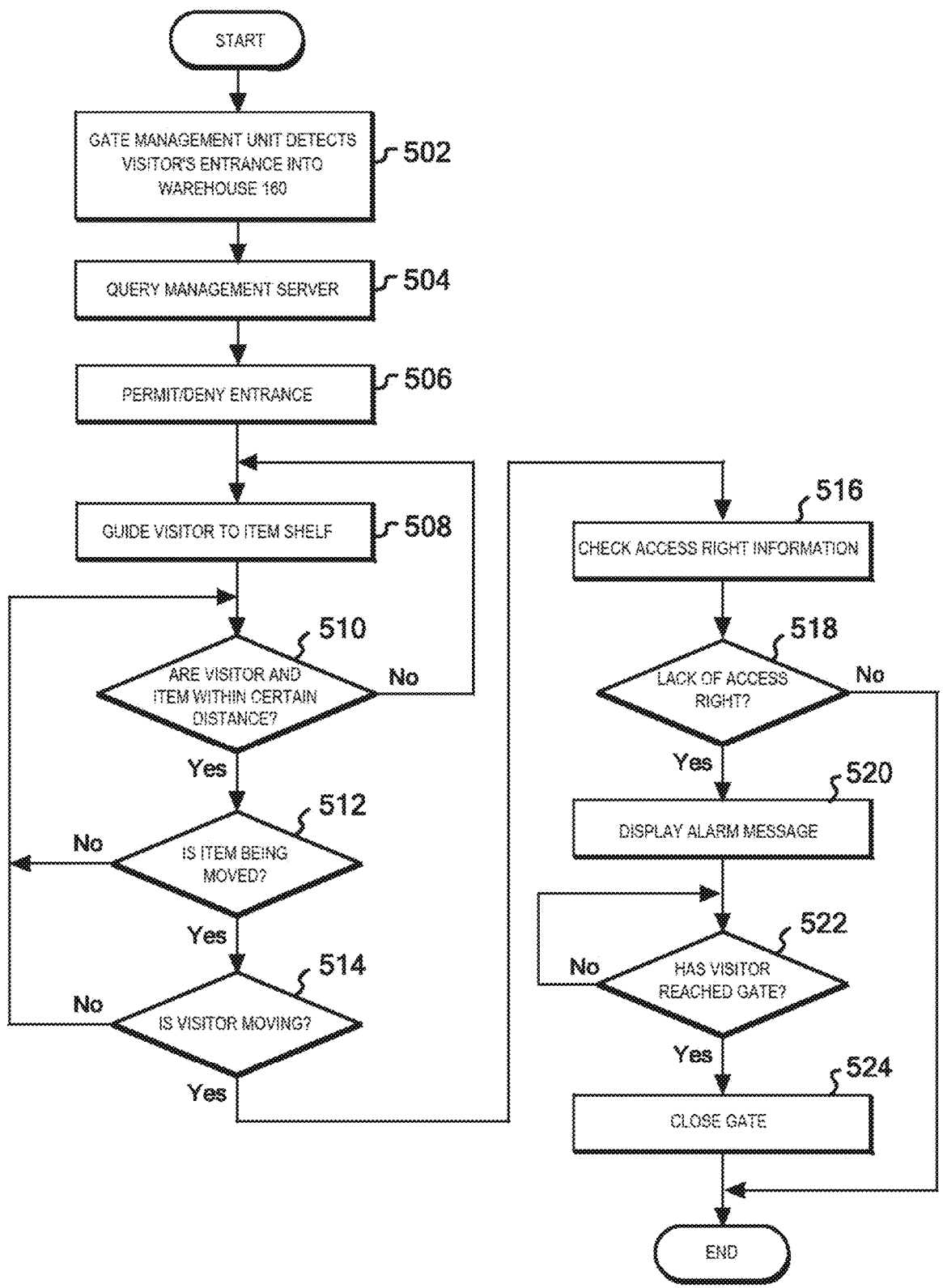
FIG. 5 is an operational flow in the object management system, in accordance with embodiments of the present invention.

FIG. 5 shows an operational flow in an object management system, in accordance with embodiments of the present invention.

When the visitor 150 (i.e., an operating object) reaches near the block unit 170, the gate management unit 104 notifies the object management apparatus 102 of this fact.

The object management control unit 1022 in the object management apparatus 102 sends, to the receiver 103, a command for obtaining the identifier of the visitor 150 from the RFID tag carried by the visitor 150. The obtained identifier is sent to the object management control unit 1022 (step 502).

The object management control unit 1022 refers to the object management database 1024. If the visitor 150 has a reservation for borrowing an object (e.g., an item) (step 504), the object management control unit 1022 controls the gate management unit 104 to open the block unit 170 which enables the visitor 150 to enter the warehouse 160 (step 506).

As described above, the object management control unit 1022 monitors the current location of the visitor 150 thereafter.

According to the location of the visitor 150 in the warehouse 160, the object management control unit 1022 may send guide information to the displays 110, 111, and 112 via the receiver 103 for guiding the visitor 150 to the reserved object (step 508).

As described above, the location management unit 1026 in the object management apparatus 102 monitors the positions of the visitor 150 and the reserved object at regular intervals, and also monitors changes in the positional information about the object over time to determine the moving speed (i.e., velocity) of the object.

If a fact is established that: (i) the visitor 150 in the warehouse 160 and the reserved object are within a predetermined (i.e. previously specified) distance of each other (step 510), (ii) the object is being moved (i.e., a movement of the object is detected in step 512), and (iii) the visit r is moving (i.e., a movement of the visitor is detected in step 514), then the location management unit 1026 notifies the object management control unit 1022 of this fact.

The object management control unit 1022 refers to the object management database 1024 to determine whether or not the visitor has a reservation for borrowing the object being moved (step 516).

If in step 518 the visitor does not have a reservation for the borrowing of the object, the object management control unit 1022 determines that the object has been illegitimately taken by the visitor 150.

In step 520, the object management control unit 1022 causes the user computer 101 to display an alarm message on a display device and transmit reports to a system manager.

The object management control unit 1022 may also control the gate management unit 104 to close the block unit 170 (step 524) when the visitor 150 is detected reaching near the gate through the receiver 103 (step 522), which prevents the visitor 150 from removing the object from the warehouse 160.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for managing an item in a place, said method comprising:
   providing, by a processor of a computer system, a reservation table in a database, said reservation table comprising:
      an item ID column that identifies the item,
      a reservation column that indicates whether or not the item is reserved for being borrowed,
      a borrower ID column that identifies an operating object,
      a borrower position column that specifies a current spatial location of the operating object, and
      an item position column that specifies a current spatial location of the item;
   sending, by the processor to a receiver receiving locational coordinates of a tag associated with the item, a first command for obtaining the current spatial location of the item, said first command identifying the item by referring to the item in the item ID column of the reservation table;
   receiving, by the processor from the receiver, the current spatial location of the item;
   updating by the processor, the item position column in the reservation table with the received current spatial location of the item;
   in response to a notification of entrance by an operating object into the place, sending, by the processor to the receiver receiving locational coordinates of a tag carried by the operating object, a second command for obtaining the current spatial location of the operating object, said second command identifying the operating object by referring to the operating object in the object ID column of the reservation table;
   receiving, by the processor from the receiver, the current spatial location of the operating object;
   updating by the processor, the borrower position column in the reservation table with the received current spatial location of the operating object;
   computing, by the processor, a distance between the item in the place and the operating object inside the place, using the spatial location of the item in the item position column of the reservation table and the spatial location of the operating object in the borrower position column of the reservation table;
   comparing, by the processor, the computed distance and a specified distance;
   determining, by the processor from said comparing, that the computed distance is within the specified distance;
   after said processor having determined that the computed distance is within the specified distance, said processor determining whether or not both the item in the place is being moved and the operating object is moving;
   determining, by the processor from the reservation column of the reservation database, that the operating object does not have a reservation for borrowing the item;
   in response to said processor having determined that both the item in the place is being moved and the operating object is moving and having further determined that the operating object does not have the reservation for borrowing the item, said processor determining that the operating object has illegitimately taken the item;
   responsive to said determining that the operating object has illegitimately taken the item, said processor preventing the operating object from removing the item from the place.

2. The method of claim 1, wherein said preventing the operating object from removing the item from the place further comprises:
   determining that the operating object is at a gate of the place, wherein a block unit is provided at the gate, wherein if the block is closed, entrance to the place is prevented and exit from the place is prevented; and
   closing the block unit to block the operating object from exiting the place.

3. The method of claim 1, wherein said method further comprises:
   said processor determining the moving speed of the item from changes in the detected spatial location of the item, said changes being determined from the detected spatial location of the item being monitored at regular intervals.

4. The method of claim 1, wherein said determining that the operating object does not have said reservation for borrowing the item comprises determining that the reservation table does not specify that the operating object has said reservation for borrowing the item.

5. A computer program product, comprising: a computer readable hardware storage device having a computer readable program code stored therein, said computer readable program code configured to be executed by a processor of a computer system to implement a method for managing an item in a place, said method comprising:
   providing, by a processor of a computer system, a reservation table in a database, said reservation table comprising:
      an item ID column that identifies the item,
      a reservation column that indicates whether or not the item is reserved for being borrowed,
      a borrower ID column that identifies an operating object,
      a borrower position column that specifies a current spatial location of the operating object, and
      an item position column that specifies a current spatial location of the item;
   sending, by the processor to a receiver receiving locational coordinates of a tag associated with the item, a first command for obtaining the current spatial location of the item, said first command identifying the item by referring to the item in the item ID column of the reservation table;
   receiving, by the processor from the receiver, the current spatial location of the item;

updating by the processor, the item position column in the reservation table with the received current spatial location of the item;

in response to a notification of entrance by an operating object into the place, sending, by the processor to the receiver receiving locational coordinates of a tag carried by the operating object, a second command for obtaining the current spatial location of the operating object, said second command identifying the operating object by referring to the operating object in the object ID column of the reservation table;

receiving, by the processor from the receiver, the current spatial location of the operating object;

updating by the processor, the borrower position column in the reservation table with the received current spatial location of the operating object;

computing, by the processor, a distance between the item in the place and the operating object inside the place, using the spatial location of the item in the item position column of the reservation table and the spatial location of the operating object in the borrower position column of the reservation table;

comparing, by the processor, the computed distance and a specified distance;

determining, by the processor from said comparing, that the computed distance is within the specified distance;

after said processor having determined that the computed distance is within the specified distance, said processor determining whether or not both the item in the place is being moved and the operating object is moving;

determining, by the processor from the reservation column of the reservation database, that the operating object does not have a reservation for borrowing the item;

in response to said processor having determined that both the item in the place is being moved and the operating object is moving and having further determined that the operating object does not have the reservation for borrowing the item, said processor determining that the operating object has illegitimately taken the item;

responsive to said determining that the operating object has illegitimately taken the item, said processor preventing the operating object from removing the item from the place.

6. The computer program product of claim 5, wherein said preventing the operating object from removing the item from the place further comprises:

determining that the operating object is at a gate of the place, wherein a block unit is provided at the gate, wherein if the block is closed, entrance to the place is prevented and exit from the place is prevented; and closing the block unit to block the operating object from exiting the place.

7. The computer program product of claim 5, wherein said method further comprises:

said processor determining the moving speed of the item from changes in the detected spatial location of the item, said changes being determined from the detected spatial location of the item being monitored at regular intervals.

8. A computer system, comprising: a processor, a memory coupled to the processor, and a computer readable storage device coupled to the processor, said storage device containing program code configured to be executed by the processor via the memory to implement a method for managing an item in a place, said method comprising:

providing, by a processor of a computer system, a reservation table in a database, said reservation table comprising:

an item ID column that identifies the item, a reservation column that indicates whether or not the item is reserved for being borrowed, a borrower ID column that identifies an operating object, a borrower position column that specifies a current spatial location of the operating object, and an item position column that specifies a current spatial location of the item;

sending, by the processor to a receiver receiving locational coordinates of a tag associated with the item, a first command for obtaining the current spatial location of the item, said first command identifying the item by referring to the item in the item ID column of the reservation table;

receiving, by the processor from the receiver, the current spatial location of the item;

updating by the processor, the item position column in the reservation table with the received current spatial location of the item;

in response to a notification of entrance by an operating object into the place, sending, by the processor to the receiver receiving locational coordinates of a tag carried by the operating object, a second command for obtaining the current spatial location of the operating object, said second command identifying the operating object by referring to the operating object in the object ID column of the reservation table;

receiving, by the processor from the receiver, the current spatial location of the operating object;

updating by the processor, the borrower position column in the reservation table with the received current spatial location of the operating object;

computing, by the processor, a distance between the item in the place and the operating object inside the place, using the spatial location of the item in the item position column of the reservation table and the spatial location of the operating object in the borrower position column of the reservation table;

comparing, by the processor, the computed distance and a specified distance;

determining, by the processor from said comparing, that the computed distance is within the specified distance;

after said processor having determined that the computed distance is within the specified distance, said processor determining whether or not both the item in the place is being moved and the operating object is moving;

determining, by the processor from the reservation column of the reservation database, that the operating object does not have a reservation for borrowing the item;

in response to said processor having determined that both the item in the place is being moved and the operating object is moving and having further determined that the operating object does not have the reservation for borrowing the item, said processor determining that the operating object has illegitimately taken the item;

responsive to said determining that the operating object has illegitimately taken the item, said processor preventing the operating object from removing the item from the place.

9. The computer system of claim 8, wherein said preventing the operating object from removing the item from the place further comprises:

determining that the operating object is at a gate of the place, wherein a block unit is provided at the gate, wherein if the block is closed, entrance to the place is prevented and exit from the place is prevented; and closing the block unit to block the operating object from exiting the place.

10. The computer system of claim 8, wherein said method further comprises:

said processor determining the moving speed of the item from changes in the detected spatial location of the item, said changes being determined from the detected spatial location of the item being monitored at regular intervals.

\* \* \* \* \*